United States Patent
Kojima

(10) Patent No.: US 9,967,528 B2
(45) Date of Patent: May 8, 2018

(54) IMAGE PROCESSING APPARATUS AND IMAGE PROCESSING METHOD

(71) Applicant: CANON KABUSHIKI KAISHA, Tokyo (JP)

(72) Inventor: Naoki Kojima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/597,206

(22) Filed: May 17, 2017

(65) Prior Publication Data
US 2017/0339381 A1 Nov. 23, 2017

(30) Foreign Application Priority Data

May 20, 2016 (JP) ................................. 2016-101936

(51) Int. Cl.
*H04N 9/31* (2006.01)
(52) U.S. Cl.
CPC ................................. *H04N 9/3179* (2013.01)
(58) Field of Classification Search
CPC .................................................... H04N 9/3179
See application file for complete search history.

(56) References Cited

U.S. PATENT DOCUMENTS

| 6,493,009 B1 * | 12/2002 | Mukai .................... B41J 2/00 346/140.1 |
| 2009/0122070 A1 * | 5/2009 | Aragaki ............. G02B 27/1046 345/589 |
| 2010/0195003 A1 | 8/2010 | Saigo |
| 2011/0018897 A1 | 1/2011 | Uchiyama et al. |
| 2013/0057769 A1 * | 3/2013 | Ishizu .................. H04N 9/3182 348/625 |
| 2016/0231964 A1 * | 8/2016 | Oki ........................ H04N 1/047 |

FOREIGN PATENT DOCUMENTS

| JP | 2009044488 A | 2/2009 |
| JP | 2015014691 A | 1/2015 |

OTHER PUBLICATIONS

Extended European Search Report issued in European Application No. 17000772.8 dated Sep. 26, 2017.

* cited by examiner

*Primary Examiner* — Michael Teitelbaum
(74) *Attorney, Agent, or Firm* — Rossi, Kimms & McDowell LLP

(57) ABSTRACT

With respect to an image of at least one color component included among a plurality of color components, an image processing apparatus decides a position shift correction amount for reducing a shift between a position indicated by data and a position in the image in a projected state, and applies position shift correction to the image based on the position shift correction amount that has been decided. The image processing apparatus calculates an edge intensity to be used in edge emphasis processing for the image based on the position shift correction amount, and executes the edge emphasis processing with respect to the image after the position shift correction based on the calculated edge intensity.

16 Claims, 15 Drawing Sheets

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

A liquid crystal projector using a plurality of liquid crystal panels is used as an apparatus that projects an image onto a large screen. With a liquid crystal projector, a color shift occurs in an image projected onto a screen due to chromatic aberration of a lens, misalignment in assembled liquid crystal panels, and so forth. There have been attempts to fix such a color shift by using a lens designed and manufactured with high precision, and by adjusting the assembly. However, the improvements in the resolution of liquid crystal panels have created the need to use a lens with higher precision and adjust the assembly over a long period of time. This has led to a proposal for a method that fixes a color shift in an image projected onto a screen by electrically correcting a position in a direction opposite to a direction of the color shift (Japanese Patent Laid-Open No. 2009-044488, hereinafter Document 1).

In Document 1, pixels in a shift-corrected image are obtained through interpolation based on pixels in an input image. This processing fixes a color shift in an image projected onto a screen, but gives rise to the problem that sharpness of edge portions of an input image drops due to the principle of interpolation processing.

SUMMARY OF THE INVENTION

One or more embodiments of the present invention provide an image processing apparatus and an image processing method that restrain a drop in sharpness caused by position shift correction.

According to one aspect of the present invention, there is provided an image processing apparatus, comprising: a decision unit configured to decide a position shift correction amount for reducing a shift between a position in an image indicated by data and a position in the image in a projected state; a calculation unit configured to calculate an edge intensity to be used in edge emphasis processing for the image based on the position shift correction amount; a correction unit configured to apply position shift correction to data of the image based on the position shift correction amount that has been decided by the decision unit; and an edge emphasis unit configured to execute the edge emphasis processing with respect to the data of the image after the position shift correction by the correction unit based on the edge intensity calculated by the calculation unit.

According to another aspect of the present invention, there is provided an image processing method, comprising: deciding a position shift correction amount for reducing a shift between a position in an image indicated by data and a position in the image in a projected state; calculating an edge intensity to be used in edge emphasis processing for the image based on the position shift correction amount; applying position shift correction to data of the image based on the position shift correction amount; and executing the edge emphasis processing with respect to the data of the image after the position shift correction based on the edge intensity.

According to another aspect of the present invention, there is provided a non-transitory computer readable storage medium storing a program for causing a computer to execute an image processing method comprising: deciding a position shift correction amount for reducing a shift between a position in an image indicated by data and a position in the image in a projected state; calculating an edge intensity to be used in edge emphasis processing for the image based on the position shift correction amount; applying position shift correction to data of the image based on the position shift correction amount; and executing the edge emphasis processing with respect to the data of the image after the position shift correction based on the edge intensity.

Further features of the present invention will become apparent from the following description of exemplary embodiments (with reference to the attached drawings).

DESCRIPTION OF THE EMBODIMENTS

The following describes some preferred embodiments of the present invention with reference to the attached drawings.

First Embodiment

Figure 1A:
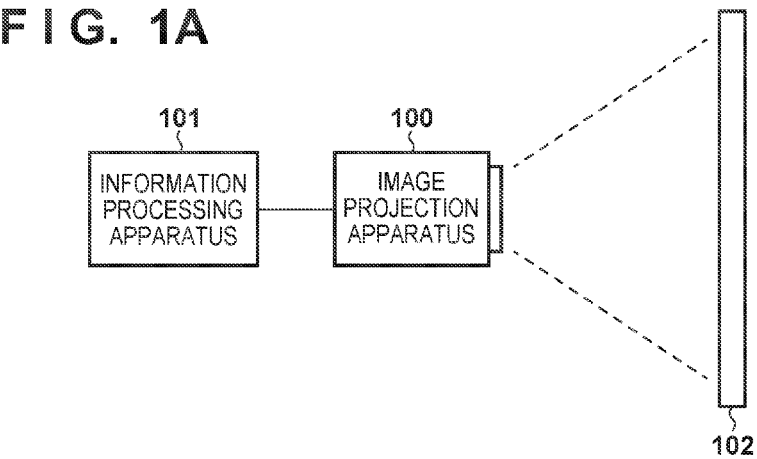
FIGS. 1A and 1B are block diagrams showing an exemplary configuration of an image projection apparatus according to an embodiment.

FIG. 1A shows an exemplary configuration of an image projection system according to the first embodiment. An image projection apparatus 100 receives, as input, images from an information processing apparatus 101 serving as an external apparatus, such as a personal computer, and projects the input images onto a screen 102.

Figure 1B:
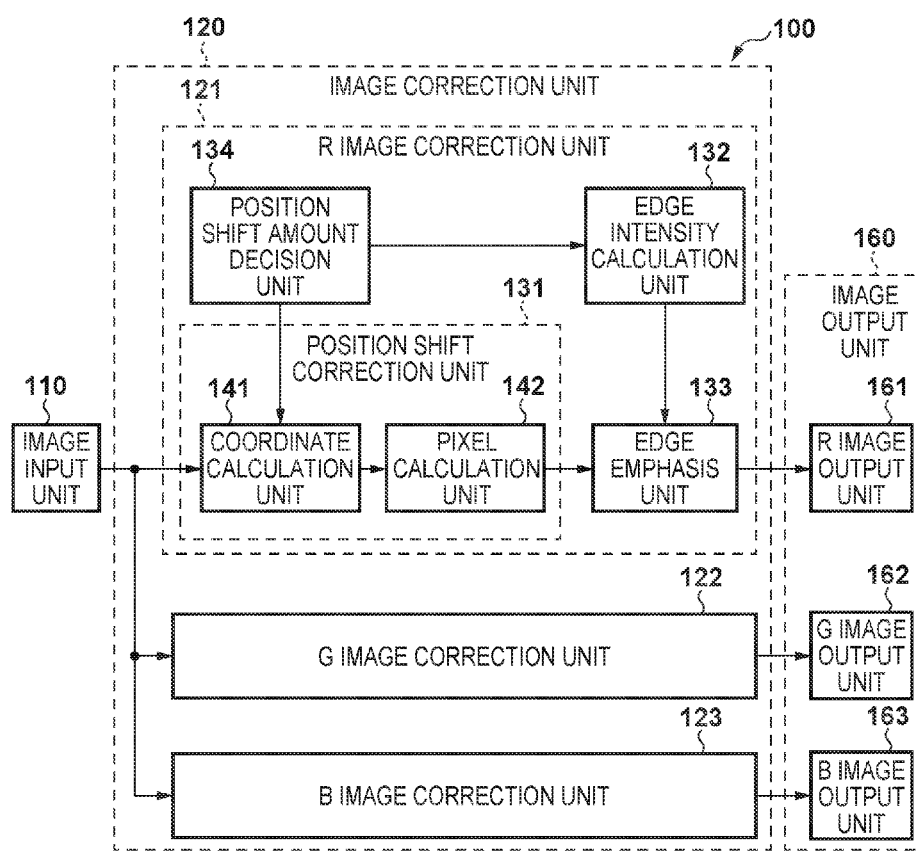

FIG. 1B is a block diagram showing an exemplary functional configuration of the image projection apparatus 100 according to the first embodiment. The image projection apparatus 100 can apply position shift correction and edge emphasis processing to input images. Note that image signals handled by the image projection apparatus 100 according to the present embodiment are composed of a plurality of color components; position shift correction is performed and the result of the correction is output for each individual color component. It will be assumed that images composed of three color components—red (R), green (G), and blue (B)—are handled in the present embodiment. The present embodiment may use a reflective liquid crystal projector or a transmissive liquid crystal projector as a projection method. A description is now given of an exemplary configuration of the image projection apparatus 100 according to the first embodiment using the block diagram of FIG. 1B. It goes without saying that the elements shown in FIG. 1B may be put in operation by a CPU executing a predetermined program, or may be constituted by dedicated hardware in part or whole.

The image projection apparatus 100 includes an image input unit 110 that inputs image signals from the external apparatus, an image correction unit 120 that corrects images, and an image output unit 160 that outputs images to a liquid crystal panel. The image correction unit 120 includes an R image correction unit 121, a G image correction unit 122, and a B image correction unit 123 that each correct images of a corresponding color component (R, G, or B) composing the image signals. Herein, R images, G images, and B images refer to data of images of only one color component, specifically, an R component, a G component, and a B component, respectively. The image output unit 160 includes an R image output unit 161, a G image output unit 162, and a B image output unit 163 that output R images, G images, and B images, respectively. Note that the R image correction unit 121, G image correction unit 122, and B image correction unit 123 handle different color components, but have the same functions; in view of this, the R image correction unit 121 will be discussed in detail below.

The R image correction unit 121 includes a position shift correction unit 131 that corrects a position shift attributed to, for example, a color shift, an edge intensity calculation unit 132 that calculates an edge intensity, an edge emphasis unit 133 that emphasizes edges in a corrected image, and a position shift amount decision unit 134 that decides position shift correction amounts. With respect to an image of at least one color component (red (R) in the present example) included among the plurality of color components, the position shift amount decision unit 134 decides position shift correction amounts for eliminating a shift between a position indicated by data and a position of a projected image. The position shift correction amounts are correction amounts intended for data of the image of the color component. The position shift correction unit 131 corrects the data of the image in accordance with the correction amounts that were decided by the position shift amount decision unit 134. The edge intensity calculation unit 132 calculates an edge intensity based on the position shift correction amounts that were decided by the position shift amount decision unit 134. Based on the edge intensity calculated by the edge intensity calculation unit 132, the edge emphasis unit 133 applies edge emphasis processing to the image corrected by the position shift correction unit 131. In the position shift correction unit 131, a coordinate calculation unit 141 calculates the coordinates of a target pixel before deformation, and a pixel calculation unit 142 calculates a pixel value of the target pixel from the coordinates of the target pixel before deformation and from pixel values of an image before deformation.

Figure 18:
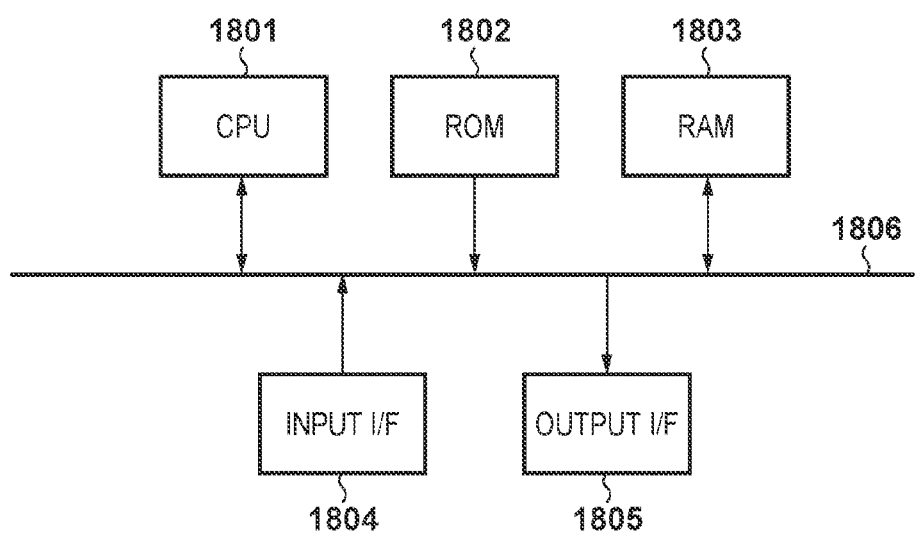
FIG. 18 is a block diagram showing an exemplary hardware configuration of an image projection apparatus according to an embodiment.

FIG. 18 shows an exemplary hardware configuration of the image projection apparatus 100 for a case in which the foregoing image processing functions are implemented by a CPU. Functional elements of the image projection apparatus 100 are put in operation by a CPU 1801 executing a predetermined program stored in a ROM 1802 and/or RAM 1803. The ROM 1802 and RAM 1803 each store the program executed by the CPU 1801 and various types of data. The RAM 1803 provides an area for temporarily storing data of an image input by the image input unit 110, and an area for putting a storage unit, such as a corrected coordinate storage unit 601 used in a second embodiment and the like, in operation. An input I/F 1804, for example, is connected to the information processing apparatus 101, and receives an image input by the information processing apparatus 101. The CPU 1801 and input I/F 1804 operate in coordination with each other to put the image input unit 110 in operation. An output I/F is connected to a projection unit (not shown) of the image projection apparatus 100, and causes the projection unit to project images. The CPU 1801 and output I/F 1805 operate in coordination with each other to put the image output unit 160 in operation. A bus 1806 enables communication between the foregoing elements by connecting them together.

Figure 2A:
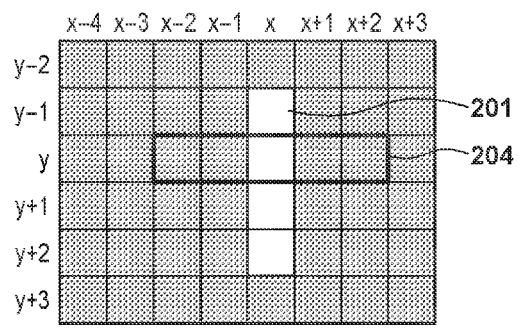
FIGS. 2A to 2F are diagrams for describing color shift correction operations.
Figure 2D:
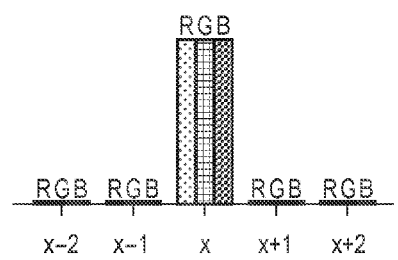
Figure 2B:
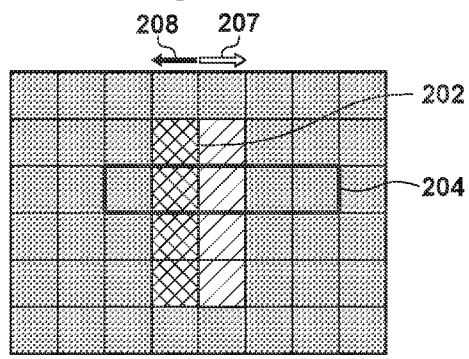
Figure 2E:
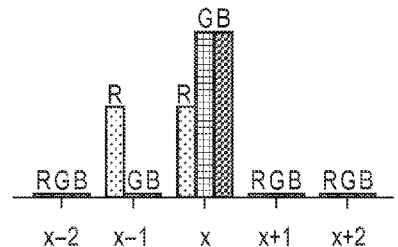

Position shift correction processing executed by the image projection apparatus 100 will now be described using FIGS. 2A to 2F and 3A to 3C. FIG. 2A schematically shows an input image input by the image input unit 110, and one cell in the figure is equivalent to one pixel. The input image shown in the figure includes a line 201 composed of white pixels surrounded by black pixels. FIG. 2D shows pixel values at the coordinates enclosed by a black frame 204 shown in FIG. 2A. Assume that, when the input image shown in FIG. 2A is projected by the image projection apparatus 100, a projected image of an R component in the line 201 is shifted rightward in a horizontal direction on the screen 102 as indicated by arrow 207 as shown in FIG. 3A. Note that such a shift is caused by chromatic aberration of an optical system of the projection apparatus, misalignment in the assembled liquid crystal panel, and so forth.

Figure 3A:
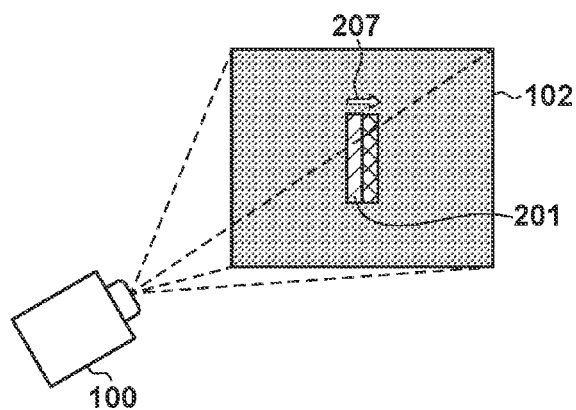
FIGS. 3A to 3C show an image placed in a projected/corrected state by the image projection apparatus.
Figure 3B:
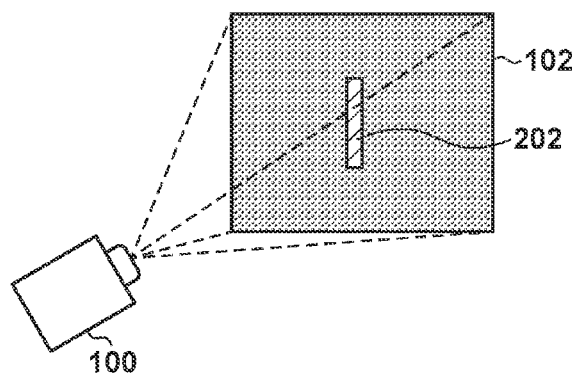

To correct such a shift, the position shift correction unit 131 of the image projection apparatus 100 corrects the input image in advance in a direction opposite to the direction of the shift. That is, the image of the R component in the input image shown in FIG. 2A is shifted in the direction opposite to the direction of the shift, specifically, leftward in the horizontal direction, as indicated by arrow 208; the resultant image in which the position shift has been corrected is shown in FIG. 2B. In FIG. 2B, a horizontal width of the R component in the line 201 has been increased and extends across two pixels, thereby forming a line 202. FIG. 2E shows pixel values in the resultant black frame 204. In this figure, a pixel value for R has spread across the range of coordinate x-1 to coordinate x, and is small at each of these coordinates compared with FIG. 2D. When the image after the position shift correction shown in FIG. 2B is projected by the image projection apparatus 100, the line 202 is projected as a shift-free image as shown in FIG. 3B. However, due to pixel interpolation in the position shift correction, the line 202 has a width extending across two pixels as shown in FIG. 2B, and has small pixel values compared with the line 201; thus, its visual sharpness drops.

Figure 2C:
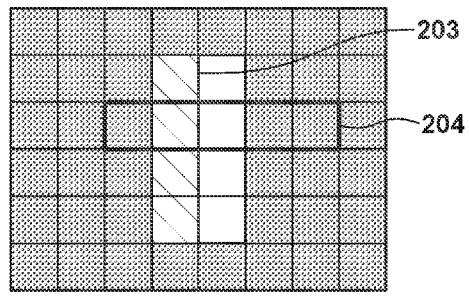
Figure 2F:
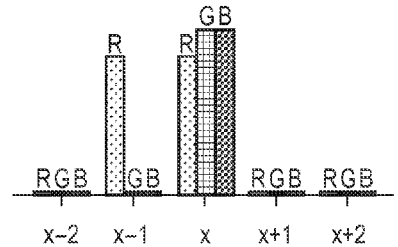
Figure 3C:
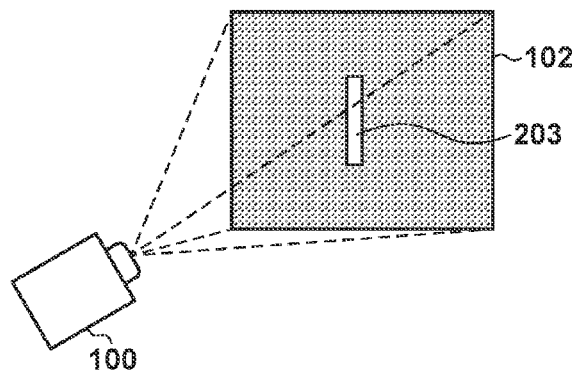

In view of this, in the present embodiment, the edge emphasis unit 133 applies edge emphasis to the image after the position shift correction shown in FIG. 2B to increase pixel values at edge portions as in a line 203 shown in FIG. 2C. FIG. 2F shows pixel values in the resultant black frame 204. As a result of the edge emphasis, pixel values for R at coordinates x-1 and x became large compared with FIG. 2E. When the image shown in FIG. 2C is actually projected by the image projection apparatus 100 onto the screen 102, the line 203 can be viewed as a shift-free line for which a drop in sharpness has been reduced as shown in FIG. 3C.

The elements of the image projection apparatus 100 shown in FIG. 1B will now be described in detail. The position shift amount decision unit 134 decides an amount by which a position shift of an R component of an input image is to be corrected. Although any correction algorithm may be used as long as it corrects not more than one pixel, correction amounts are decided using the following expressions in the present embodiment.

$$x_o = x_i + \delta x$$

$$y_o = y_i + \delta y \quad \text{Expression 1}$$

Here, $(x_i, y_i)$ denotes coordinates in the input image, and $\delta x$ and $\delta y$ denote coordinate moving amounts in the horizontal direction and the vertical direction, respectively. Furthermore, $(x_o, y_o)$ denotes coordinates in the image after deformation. The position shift amount decision unit 134 decides the coordinate moving amounts $\delta x$ and $\delta y$. For example, referring to FIG. 3A, provided that the projected R image is shifted rightward by 0.5 pixels (in the present example, it will be assumed that the projected R image is not shifted in the up-down direction), the position shift amount decision unit 134 decides -0.5 and 0.0 as $\delta x$ and $\delta y$, respectively, to correct the shift in the direction opposite to the direction of the shift. Note that the R image correction unit 121, G image correction unit 122, and B image correction unit 123 decide position shift correction amounts for an R image, G image, and B image, respectively, independently of each other.

Based on the correction amounts that were decided by the position shift amount decision unit 134, the position shift correction unit 131 applies position correction processing to an input image of an R component. The present embodiment uses, as a method of position correction, image deformation that makes use of rearrangement based on inverse transformation commonly used in keystone correction and the like. This image deformation is a method that relies on rearrangement based on inverse transformation: each pixel in an image after deformation is used as a target pixel, the coordinates of the target pixel before deformation are obtained by coordinate transformation, and a pixel value of the target pixel is calculated using the coordinates before deformation and surrounding pixel values.

Figure 4:
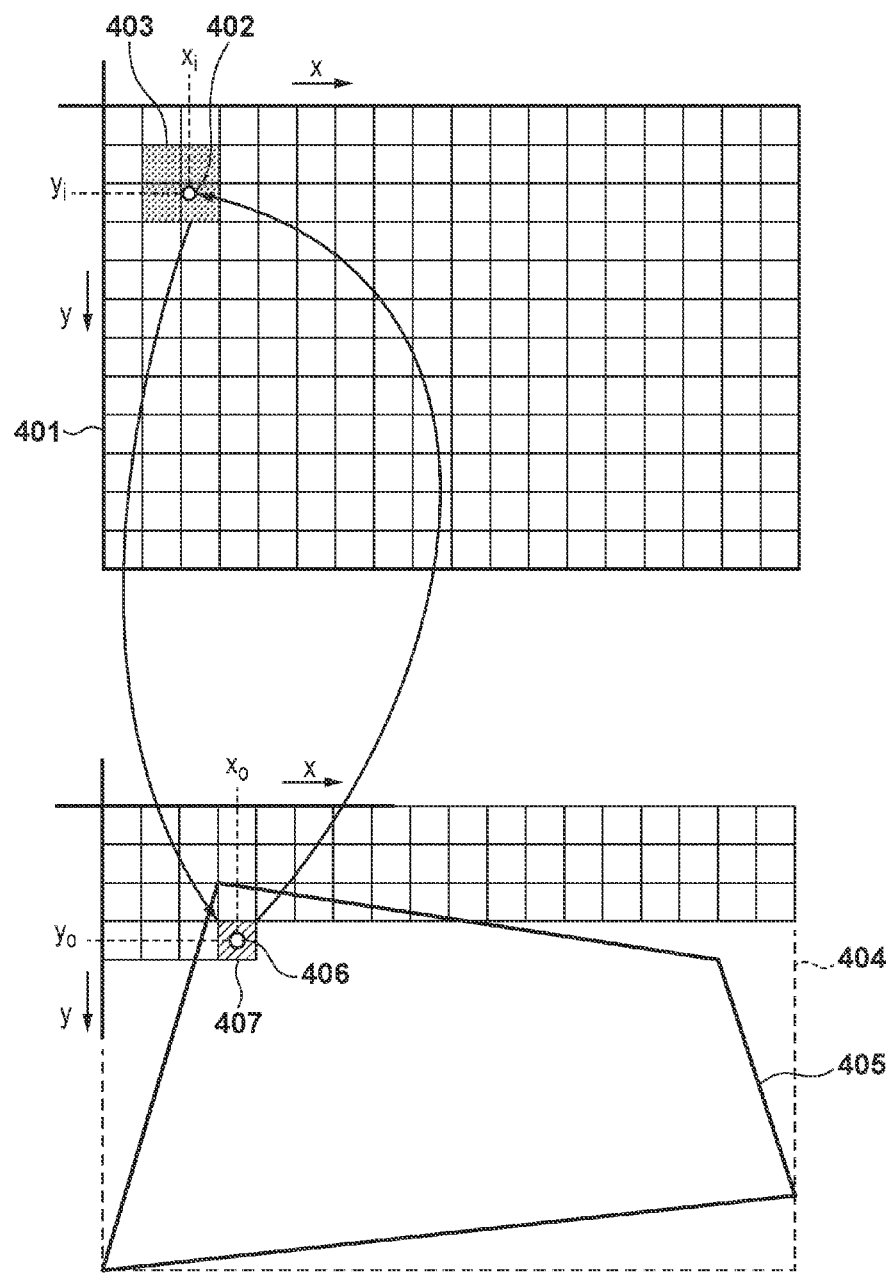
FIG. 4 shows a method of calculating a pixel value used in keystone correction.

The aforementioned image deformation processing will now be described using an example of FIG. 4 (keystone correction). It will be assumed that an image 401 before deformation turns into an image 404 after deformation as a result of image deformation. FIG. 4 depicts a case in which the image 401 before deformation is deformed into a shape of a trapezoid 405, and the image 404 after deformation is a rectangle including the trapezoid 405. To obtain pixel values of pixels in the image 404 after deformation, first, coordinates 402 $(x_i, y_i)$ of a point $P_i$ before deformation, which correspond to coordinates 406 $(x_o, y_o)$ of a point $P_o$ serving as a target pixel 407 in the image 404 after deformation, are obtained. In the example of FIG. 4, this calculation method is inverse transformation of an operator for transformation into the trapezoid; a detailed description thereof will be omitted.

The coordinates 402 $(x_i, y_i)$ before deformation thus obtained include fractional values, and a pixel value of the target pixel 407 is obtained from a group of pixels surrounding the coordinates 402. In the example of FIG. 4, a pixel group 403 composed of four pixels, or two-by-two pixels, is used as the group of surrounding pixels. The pixel value of the target pixel 407 is calculated through, for example, interpolation computation using the pixel group 403 and the coordinates 402 before deformation $(x_i, y_i)$. The position shift correction unit 131 performs the position shift correction based on the principle similar to the foregoing image deformation. A description is now given of the operations of the coordinate calculation unit 141 and pixel calculation unit 142, which are sub-blocks in the position shift correction unit 131. It will be assumed that, when an image shape is converted (geometric distortion is corrected) separately from color shift correction, such conversion is executed before correction by the position shift correction unit 131. Correction of geometric distortion refers to, for example, correction for eliminating distortion of a projected shape when projection is performed obliquely with respect to a projection screen.

The coordinate calculation unit 141 obtains coordinates before deformation from the correction amounts that were decided by the position shift amount decision unit 134 and from the coordinates of a target pixel. In the present embodiment, the position shift correction amounts that were decided by the position shift amount decision unit 134 are $\delta x$ and $\delta y$, and position shift correction (color shift correction) is performed by translating the entire image by $\delta x$ in the x-direction and $\delta y$ in the y-direction. Therefore, provided that the coordinates of the target pixel are $(x_{od}, y_{od})$, coordinates before deformation $(x_{id}, y_{id})$ are as follows.

$$x_{id} = x_{od} - \delta x$$

$$y_{id} = y_{od} - \delta y \quad \text{Expression 2}$$

Using the method described with reference to FIG. 4, the pixel calculation unit 142 obtains the pixel value of the target pixel after deformation from the coordinates before deformation that were calculated by the coordinate calculation unit 141 and from pixels surrounding the coordinates before deformation. In FIG. 4, the pixel value of the target pixel is obtained from the pixel group 403 and the coordinates 402 $(x_i, y_i)$ of the point Pi before deformation. Note that the pixel value may be calculated using any known method, such as a common bilinear method and a bicubic method.

The edge emphasis unit 133 executes edge emphasis processing with respect to the image corrected by the position shift correction unit 131; this edge emphasis processing differs depending on a position in the corrected image. Any edge emphasis method may be used; for example, edges may be emphasized using Expression 3 provided below.

$$g(x) = d(x_4) - \varepsilon \sum_{k=0}^{8} D_k d(x_k)$$

Expression 3

Here, g(x) denotes a pixel in an image with emphasized edges. Furthermore $d(x_k)$ (k=0, 1, ..., 8) denotes a pixel value of a pixel in the corrected image ($d(x_4)$ corresponds to the target pixel, and others correspond to eight pixels that neighbor $d(x_4)$). $D_k$ (k=0, 1, ..., 8) denotes a filter coefficient for edge emphasis (e.g., $D_4$ denotes a filter coefficient of −8, and others denote a filter coefficient of 1). An edge intensity is denoted by E, and the effect of edge emphasis can be adjusted by a value of the edge intensity $\epsilon$. When $\epsilon$=0, edges are not emphasized. The edge intensity $\epsilon$ is changed depending on the position shift correction amounts (δx and δy), or on a position in the image after the position shift correction. The edge intensity is calculated by the edge intensity calculation unit 132.

The edge intensity calculation unit 132 calculates an edge emphasis parameter used by the edge emphasis unit 133 from a correction amount for the target pixel. Although the edge intensity calculation unit 132 calculates the edge intensity $\epsilon$ as the edge emphasis parameter in the present embodiment, the edge emphasis parameter may be another parameter, such as a parameter for turning ON/OFF edge emphasis. When the position shift correction has been performed, that is, when the target pixel has moved from the original position, the intensity is decided in accordance with moving amounts of the target pixel; when the position shift correction has not been performed, that is, when the target pixel has not moved from the original position, the intensity is set to zero or a value near zero. Setting the intensity to zero means that edges are not emphasized (the edge intensity $\epsilon$=0).

In the present embodiment, the edge emphasis unit 133 uses a two-dimensional filter, and the position shift amount decision unit 134 decides the correction amounts δx and δy in two directions. Furthermore, the pixel calculation unit 142 obtains a pixel value using interpolation based on neighboring pixels, such as a bilinear method, which causes a drop in the image sharpness. In view of this, it is preferable that the edge intensity be changed depending on fractional values of δx and δy. In the present embodiment, the edge intensity calculation unit 132a calculates the edge intensity in accordance with the following expression so that the larger a difference between a value of a position shift correction amount inclusive of a fractional value and the nearest-neighbor integer value, the larger the degree of edge emphasis.

$$\varepsilon = ((h(Dec(\delta x)) + h(Dec(\delta y)))/2)/0.5,$$

Expression 4 where $Dec(x)$ is a fractional value of $x$, and $$h(x) = \begin{cases} x & x <= 0.5 \\ 1-x & x > 0.5 \end{cases}$$

In the foregoing calculation method, the edge intensity may be calculated using fractional values of the coordinates of the target pixel before deformation, which are output by the coordinate calculation unit 141, because a similar result is achieved when such fractional values are used in place of the fractional values of the correction amounts. In this case, in FIG. 1B, the coordinate calculation unit 141 and the edge intensity calculation unit 132 are connected, and the position shift amount decision unit 134 and the edge intensity calculation unit 132 may not be connected. In Expression. 4, division by "2" is performed to calculate an average value of values h( ) in the x-direction and the y-direction. Furthermore, division by "0.5" is performed to normalize an average value of values h( ) in the range of 0 to 0.5 to the range of 0 to 1, and to give the edge intensity $\epsilon$ a value in the range of 0 to 1.

Figure 5:
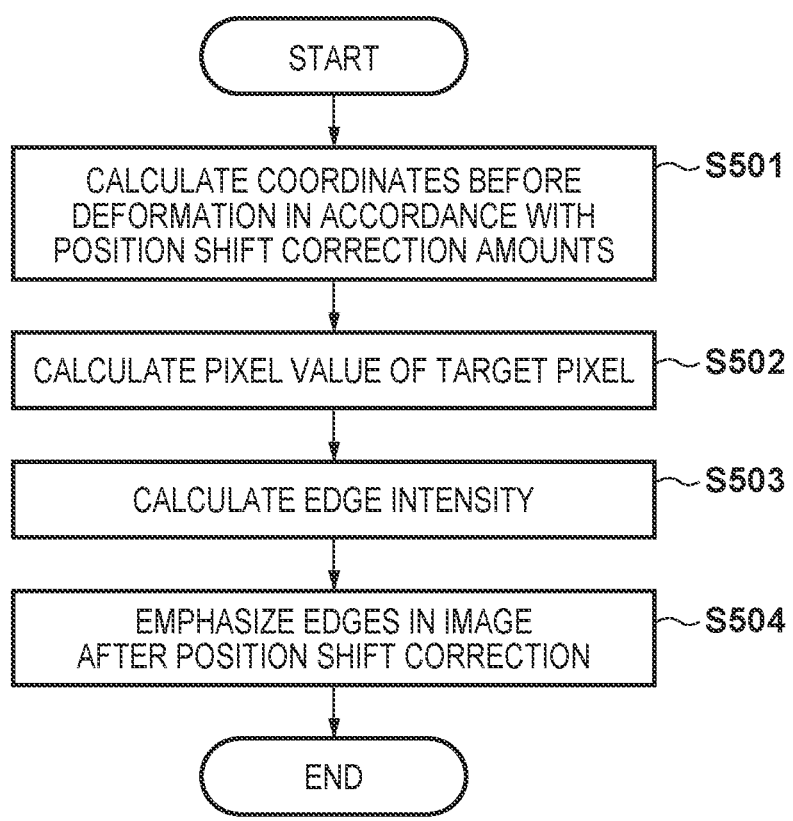
FIG. 5 is a flowchart showing position shift correction processing according to an embodiment.

The foregoing processing is illustrated by a flowchart of FIG. 5. FIG. 5 is a flowchart showing the position shift correction processing and the edge emphasis processing according to the first embodiment. Note that every pixel in an image after deformation is used as a target pixel, and processes of steps described below are executed with respect to each target pixel. In step S501, with respect to a target pixel after deformation, the coordinate calculation unit 141 calculates coordinates before deformation based on the correction amounts (δx and δy) that were decided by the position shift amount decision unit 134. In step S502, the pixel calculation unit 142 calculates a pixel value of the target pixel based on the coordinates before deformation that were calculated by the coordinate calculation unit 141 and on a group of pixels surrounding the coordinates before deformation. In step S503, the edge intensity calculation unit 132 calculates an edge intensity $\epsilon$, which is an edge emphasis parameter, based on the correction amounts (δx and δy) that were decided by the position shift amount decision unit 134. In step S504, the edge emphasis unit 133 emphasizes edges in the image after position shift correction, which is output from the position shift correction unit 131.

The R image correction unit 121 generates a corrected image of an R component by applying the foregoing processing to every pixel in the image after deformation. The G image correction unit 122 and B image correction unit 123 generate corrected images of a G component and a B component, respectively, by executing similar processing. The corrected images of the R, G, and B components thus generated are projected onto the screen 102 by the R image output unit 161, G image output unit 162, and B image output unit 163, respectively.

Although an image is composed of three color components corresponding to R, G, and B in the description of the present embodiment, no limitation is intended in this regard. It goes without saying that the present embodiment is also applicable to, for example, an image composed of four color components corresponding to R, G, B, and Y, an image composed of four color components corresponding to R, G, B, and infrared light, and an image composed of only one color component corresponding to infrared light. It also goes without saying that the present embodiment is alternatively applicable to an image composed of a combination of one or more color components selected from the group consisting of R, G, B, Y, and infrared light.

As described above, in the first embodiment, the edge emphasis unit emphasizes edges in accordance with the correction amounts used in the position shift correction; thus, the first embodiment can provide an image projection apparatus that can appropriately restrain deterioration in sharpness caused by the position shift correction.

Second Embodiment

In the first embodiment, the position shift amount decision unit 134 uniquely decides position shift correction amounts indicating a moving direction and moving amounts of a pixel in the position shift correction. That is, in the first embodiment, with respect to one color component, an entire screen undergoes constant position shift correction (δx and δy) and edge emphasis processing using a constant edge intensity. A second embodiment introduces a configuration that enables finer position shift correction by making correction amounts (a moving direction and moving amounts) variable on a screen, and emphasizes edges in accordance with such correction amounts.

Figure 6:
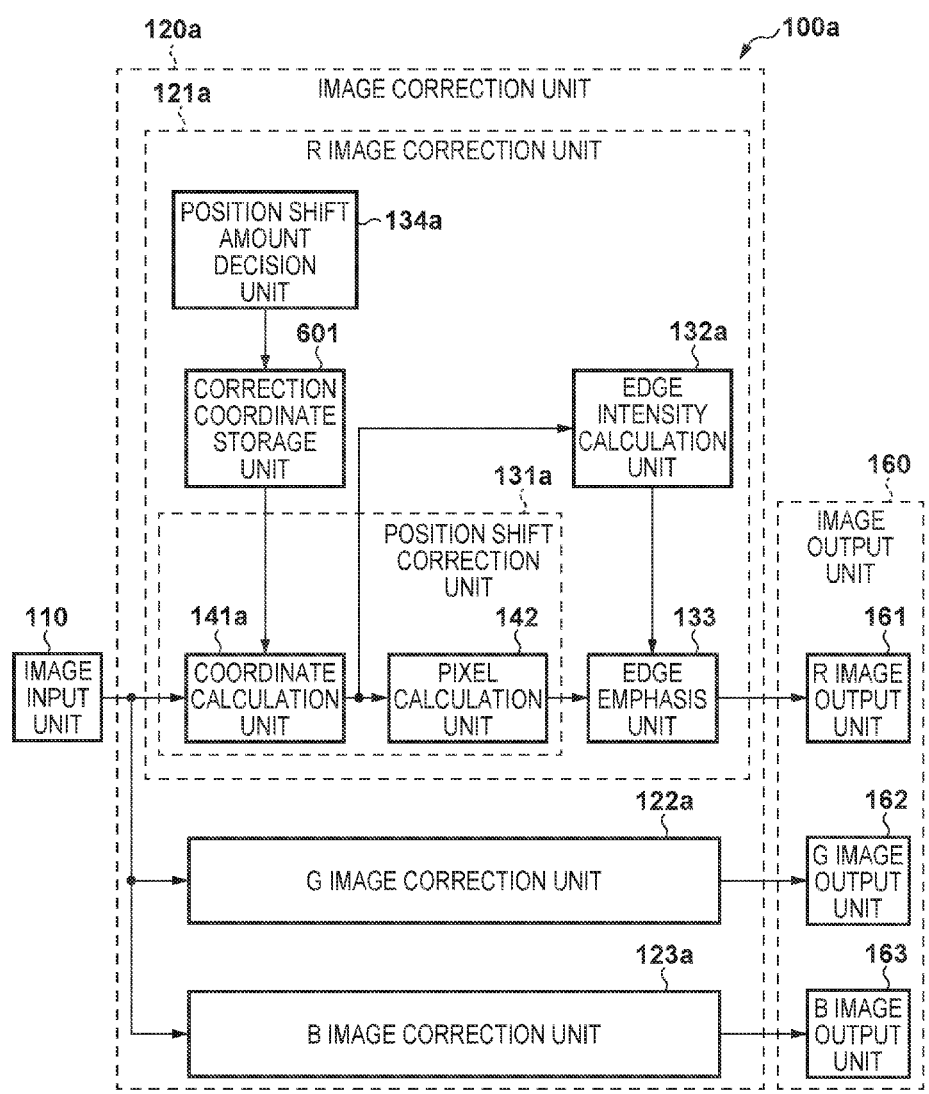
FIG. 6 is a block diagram showing an exemplary configuration of an image projection apparatus according to an embodiment.

FIG. 6 shows a configuration of an image projection apparatus 100a according to the second embodiment. A description is now given of an exemplary configuration of the image projection apparatus 100a according to the second embodiment using a block diagram of FIG. 6. Note that the elements similar to the elements of the first embodiment (FIG. 1B) are given the same reference numerals thereas. Furthermore, a configuration of an image projection system according to the second embodiment is similar to that according to the first embodiment (FIG. 1A). Although it will be assumed that the elements shown in FIG. 6 are put in operation by a non-illustrated CPU executing a predetermined program, it goes without saying that they may be constituted by dedicated hardware in part or whole. The present embodiment also uses the hardware configuration described with reference to FIG. 18.

The image projection apparatus 100a includes an image input unit 110 that inputs images, an image correction unit 120a that corrects images, and an image output unit 160 that outputs images to a liquid crystal panel. The image correction unit 120a includes an R image correction unit 121a, a G image correction unit 122a, and a B image correction unit 123a that correct R images, G images, and B images, respectively. The R image correction unit 121a, G image correction unit 122a, and B image correction unit 123a have the same functions; in view of this, the R image correction unit 121a will be discussed below.

The R image correction unit 121a includes a position shift correction unit 131a that corrects a position shift in an input image, an edge intensity calculation unit 132a that calculates an edge intensity, an edge emphasis unit 133 that emphasizes edges in a corrected image, and a position shift amount decision unit 134a that decides position shift correction amounts. The R image correction unit 121a further includes a correction coordinate storage unit 601 that stores position shift correction coordinates that were decided by the position shift amount decision unit 134a. The position shift correction unit 131a includes a coordinate calculation unit 141a that calculates the coordinates of a target pixel before deformation, and a pixel calculation unit 142 that calculates a pixel value of the target pixel from the coordinates of the target pixel before deformation and from an image before deformation. The following description mainly deals with the elements of the R image correction unit 121a that differ from their counterparts in the first embodiment.

Figure 7:
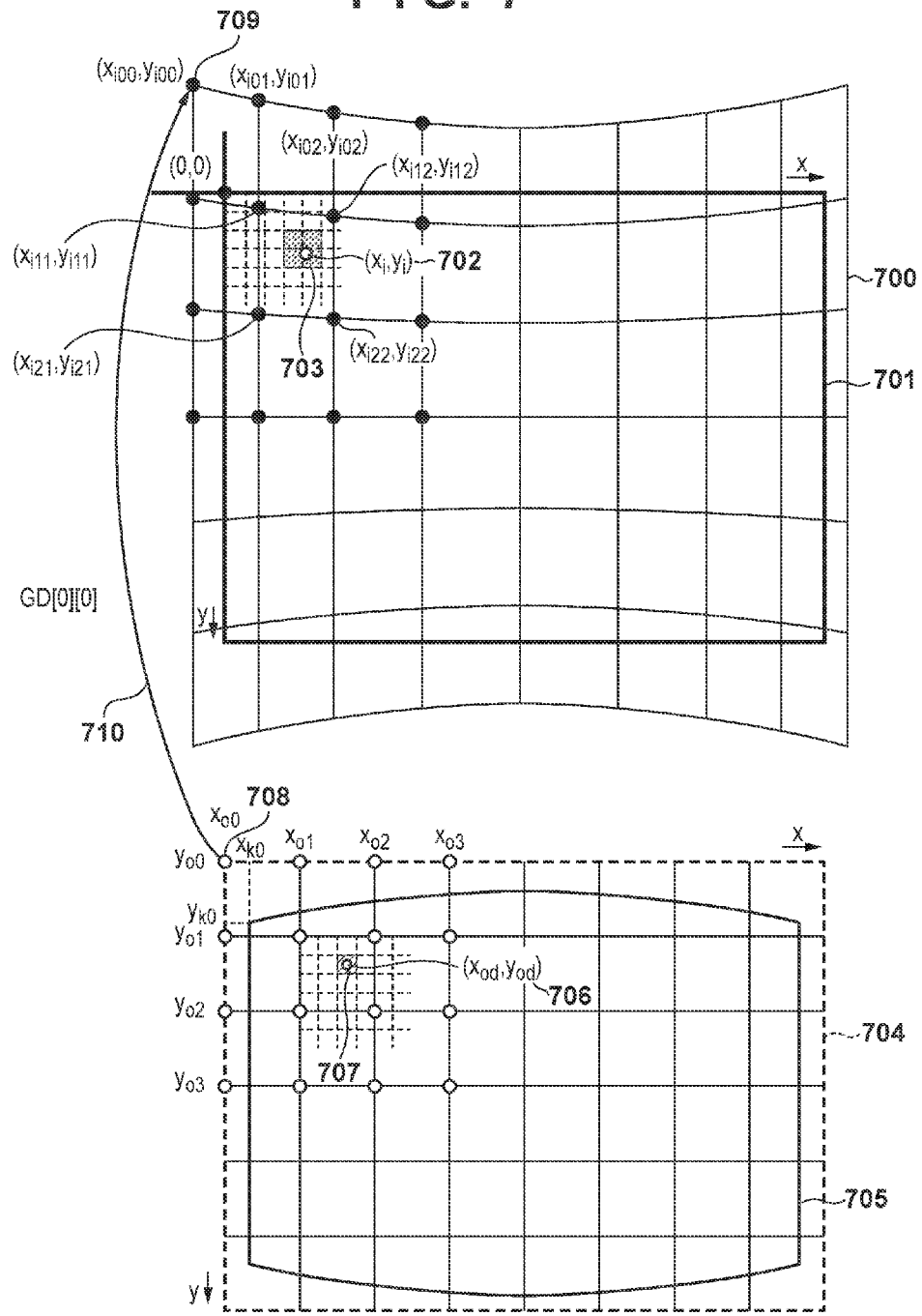
FIG. 7 is a diagram for describing position shift correction processing according to an embodiment.

First, position shift correction implemented in the second embodiment will be described using FIG. 7. FIG. 7 shows an input image 701 before deformation, and an image 704 after deformation. It will be assumed that the input image 701 is deformed into a shape of a graphic 705. The image 704 after deformation is a rectangle including the graphic 705. Placing the image 704 after deformation back into a pre-deformation state will yield an image 700. To obtain pixel values of pixels in the image 704 after deformation, a later-described method is used to obtain coordinates 702 before deformation $(x_i, y_i)$ that correspond to the coordinates 706 of a target pixel 707 after deformation $(x_o, y_o)$ in the image 704 after deformation. The coordinates 702 before deformation $(x_i, y_i)$ include fractional values, and a pixel value of the target pixel 707 is obtained from a group of pixels surrounding these coordinates. In the example of FIG. 7, the pixel value of the target pixel 707 is calculated through, for example, interpolation computation using the coordinates 702 before deformation $(x_i, y_i)$ and the group of surrounding pixels, specifically, a pixel group 703 composed of four pixels, or two-by-two pixels.

The second embodiment uses a calculation method using representative points in calculating coordinates before deformation from coordinates after deformation. First, coordinates before deformation $(x_i, y_i)$ that correspond to a representative point in the image after deformation $(x_o, y_o)$ are decided. In the example of FIG. 7, transformation 710 is applied to decide coordinates 709 before deformation $(x_{i00}, y_{i00})$ that correspond to a representative point 708 $(x_{o0}, y_{o0})$. With respect to other representative points, coordinates before deformation are similarly decided. The coordinate calculation unit 141a uses these representative points to obtain coordinates before deformation that correspond to arbitrary coordinates after deformation. Hereinafter, coordinates after deformation $(x_{oh}, y_{ov})$ will be expressed as pvh, and coordinates before deformation $(x_{ih}, y_{iv})$ will be expressed as qvh.

The aforementioned processing for deciding coordinates before deformation that correspond to a representative point in the image after deformation is executed by the position shift amount decision unit 134a. The correction coordinate storage unit 601 stores the coordinates that were decided by the position shift amount decision unit 134a. In the present embodiment, the correction coordinate storage unit 601 stores coordinates before movement caused by the position shift correction (coordinates before transformation) for each of a plurality of representative points set in an image after the position shift correction.

The position shift amount decision unit 134a decides coordinates before deformation that correspond to representative points in the image after deformation as correction coordinates of the representative points. This is expressed by the following expression.

$$q=f(p) \hspace{2cm} \text{Expression 5}$$

Here, p denotes coordinates after deformation, q denotes coordinates before deformation, and f( ) denotes an operator that associates the coordinates after deformation with the coordinates before deformation. In other words, the position shift amount decision unit 134a decides coordinates of each representative point before deformation using the operator. These coordinates before deformation may be decided based on a mathematical expression, or may be decided based on correction amounts that vary with each representative point. Alternatively, these coordinates before deformation may be obtained by adding correction amounts designated by a user to an operator based on a mathematical expression.

As stated earlier, the position shift amount decision unit 134a stores the coordinates before deformation that were decided to the correction coordinate storage unit 601. The number of sets of coordinates before deformation stored in the correction coordinate storage unit 601 is (W/N)×(H/N), for example, provided that the representative points are set at an interval of N pixels in both horizontal and vertical directions and the image after deformation has a resolution of W pixels in the horizontal direction and H pixels in the vertical direction. In the second embodiment, the aforementioned operator f( ) is substituted with a lookup table (hereinafter, LUT), and coordinates before deformation are expressed as follows.

$$qvh(x_{ih}, y_{iv}) = f(pvh(x_{oh}, y_{ov})) = GD[v][h] \quad \text{Expression 6}$$

This expression means that coordinates pvh after deformation correspond to coordinates qvh before deformation. Here, GD[ ][ ] is the LUT indicating the operator f. Note that h is a representative point index for the horizontal direction, and v is a representative point index for the vertical direction. Referring to FIG. 7, this expression means that coordinates before deformation $(x_{i00}, y_{i00})$ that correspond to coordinates after deformation $(x_{o0}, y_{o0})$ are stored in GD[0][0]. The pixel interval N at which the representative points are set may be one. In this case, the representative points are set at an interval of one pixel, that is, the correction coordinate storage unit 601 stores coordinates before deformation with respect to every point.

Figure 8A:
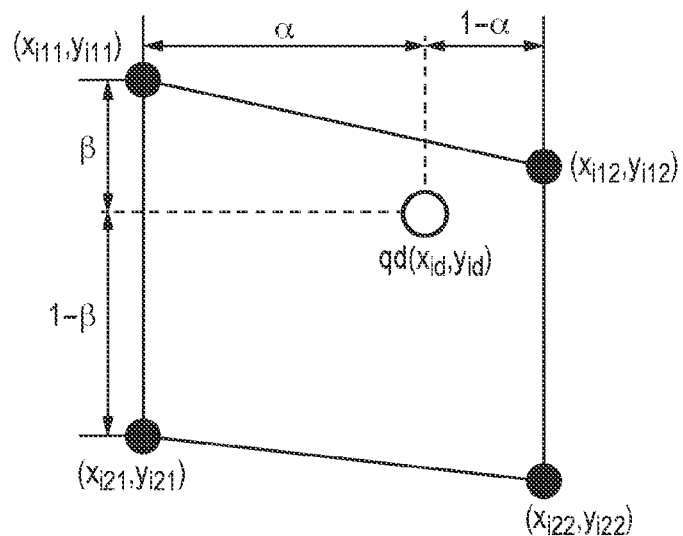
FIGS. 8A and 8B show a method of calculating coordinates before deformation according to an embodiment.
Figure 8B:
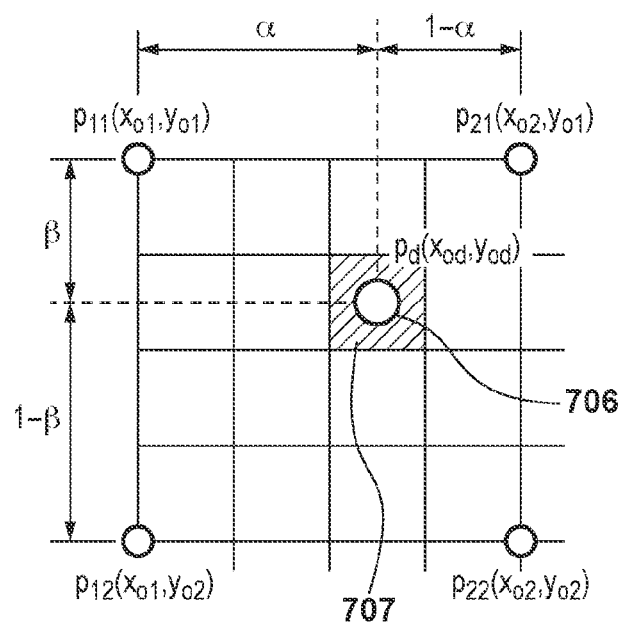

The coordinate calculation unit 141a obtains coordinates of the target pixel before deformation from correction amounts stored in the correction coordinate storage unit 601 and from the coordinates of the target pixel after deformation. FIGS. 8A and 8B show examples of a calculation method. FIG. 8A is an enlarged partial view of the input image 701 before deformation, and FIG. 8B is an enlarged partial view of the image 704 after deformation. The target pixel 707 is depicted as a point pd, and its coordinates 706 are $(x_{od}, y_{od})$. This single point, or target pixel, pd in the image after deformation corresponds to a point qd in the image before deformation, and the coordinates 702 of the point qd are $(x_{id}, y_{id})$. These coordinates 702 before deformation are calculated from correction amounts for representative points surrounding the coordinates 706 after deformation. Specifically, the coordinates 702 before deformation are calculated by applying a position of the target pixel relative to four surrounding representative points to a position of the coordinates 702 before deformation relative to the coordinates of surrounding representative points before deformation.

As the coordinates 702 of the target pixel before deformation are obtained by pixel-by-pixel scanning, the coordinates 706 after deformation $(x_{od}, y_{od})$ are known. Furthermore, as the pixel interval at which the representative points are set is known, representative points p11, p12, p21, and p22, as well as their coordinates $(x_{o1}, y_{o1})$, $(x_{o2}, y_{o1})$, $(x_{o2}, y_{o2})$, and $(x_{o1}, y_{o2})$, are also known. Therefore, provided that a quadrilateral formed by the representative points p11, p12, p21, and p22 is a unit quadrilateral, a relative position α in the horizontal direction and a relative position β in the vertical direction of the target pixel 707 from the coordinates $(x_{o1}, y_{o1})$ are calculated using the following expressions.

$$\alpha = (x_{od} - x_{o1})/(x_{o2} - x_{o1})$$

$$\beta = (y_{od} - y_{o1})/(y_{o2} - y_{o1}) \quad \text{Expression 7A}$$

Next, using these relative positions, the coordinates 702 before deformation $(x_{id}, y_{id})$ are calculated as follows.

$$x_{id} = x_{i11} + \{\alpha/(x_{i12} - x_{i11})\}$$

$$y_{id} = y_{i11} + \{\alpha/(y_{i21} - y_{i11})\} \quad \text{Expression 7B}$$

Figure 8C:
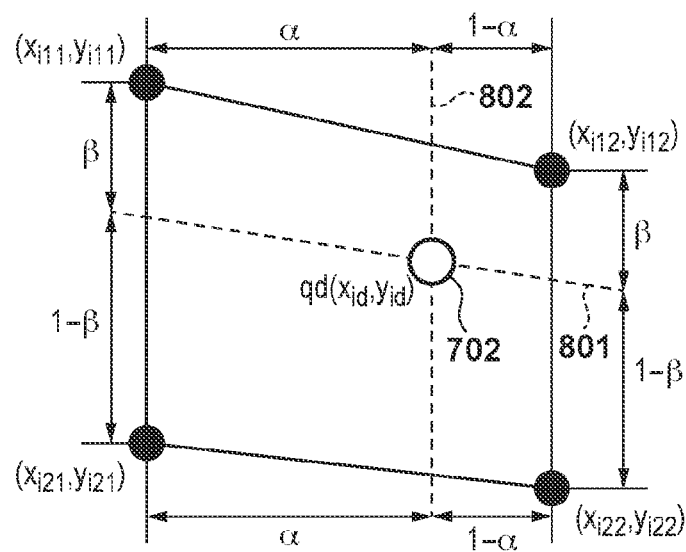
FIGS. 8C and 8D show another method of calculating coordinates before deformation according to an embodiment.
Figure 8D:
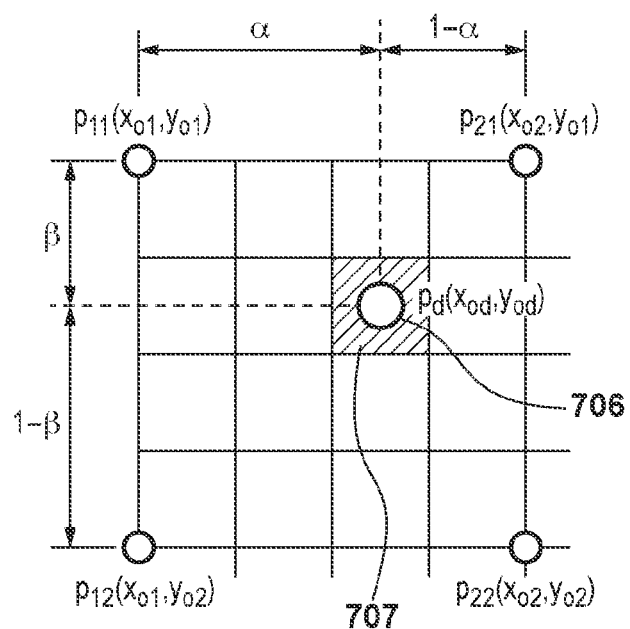

A calculation method shown in FIGS. 8C and 8D may be used to obtain the coordinates of the target pixel before deformation from the correction amounts stored in the correction coordinate storage unit 601 and from the coordinates of the target pixel after deformation. FIG. 8C is an enlarged partial view of the input image 701, and FIG. 8D is an enlarged partial view of the image 704 after deformation. The target pixel 707 is depicted as a point pd, and its coordinates 706 after deformation are $(x_{od}, y_{od})$. This single point, or target pixel, pd in the image after deformation corresponds to a point qd in the image before deformation, and the coordinates 702 of the point qd before deformation are $(x_{id}, y_{id})$. These coordinates 702 before deformation are calculated from correction amounts for representative points surrounding the coordinates 706 after deformation. Specifically, the coordinate calculation unit 141a calculates the coordinates 702 before deformation by applying a position of the target pixel relative to four surrounding representative points to a position relative to the coordinates of the surrounding representative points before deformation.

As the coordinates 702 of the target pixel before deformation (assumed here as coordinates $(x_{id}, y_{id})$) are obtained by pixel-by-pixel scanning, the coordinates 706 after deformation (assumed here as coordinates $(x_{od}, y_{od})$) are known. Furthermore, as the pixel interval at which the representative points are set is known, representative points p11, p12, p21, and p22, as well as their coordinates $(x_{o1}, y_{o1})$, $(x_{o2}, y_{o1})$, $(x_{o2}, y_{o2})$, and $(x_{o1}, y_{o2})$, are also known. Therefore, provided that a quadrilateral formed by the representative points p11, p12, p21, and p22 is a unit quadrilateral, a relative position α in the horizontal direction and a relative position β in the vertical direction of the target pixel 707 from the coordinates $(x_{o1}, y_{o1})$ are calculated using the above-referenced Expression 7A.

Then, using these relative positions α and β and the coordinates before transformation that correspond to the representative points p11, p12, p21, and p22, the coordinates 702 of the target pixel before deformation $(x_{id}, y_{id})$ are calculated as shown in FIG. 8C (a point of intersection between straight lines 801 and 802 is calculated). Using the method described in the first embodiment, the pixel calculation unit 142 obtains a pixel value of the target pixel after deformation from the coordinates before deformation that were calculated by the coordinate calculation unit 141a and from pixels surrounding the coordinates before deformation.

Next, the edge intensity calculation unit 132a calculates an intensity of edge emphasis using the coordinates of the target pixel before deformation that were calculated by the coordinate calculation unit 141a. The edge intensity can be calculated using, for example, a method similar to the method according to the first embodiment (Expression 4). However, in the second embodiment, the correction amounts (δx and δy) are obtained from the coordinate calculation unit 141a, and vary with each two-dimensional position in the corrected image. Therefore, the value of the edge intensity ε calculated by the edge intensity calculation unit 132a also varies with each two-dimensional position in the image.

Figure 9:
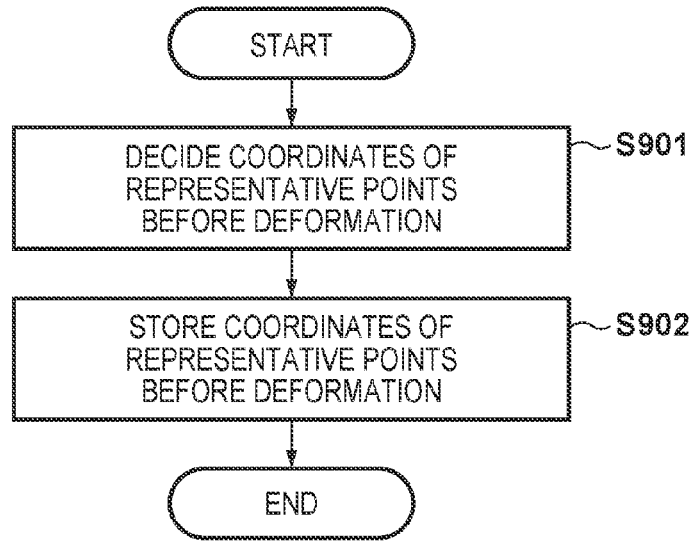
FIG. 9 is a flowchart showing processing for storing coordinates before deformation according to an embodiment.
Figure 10:
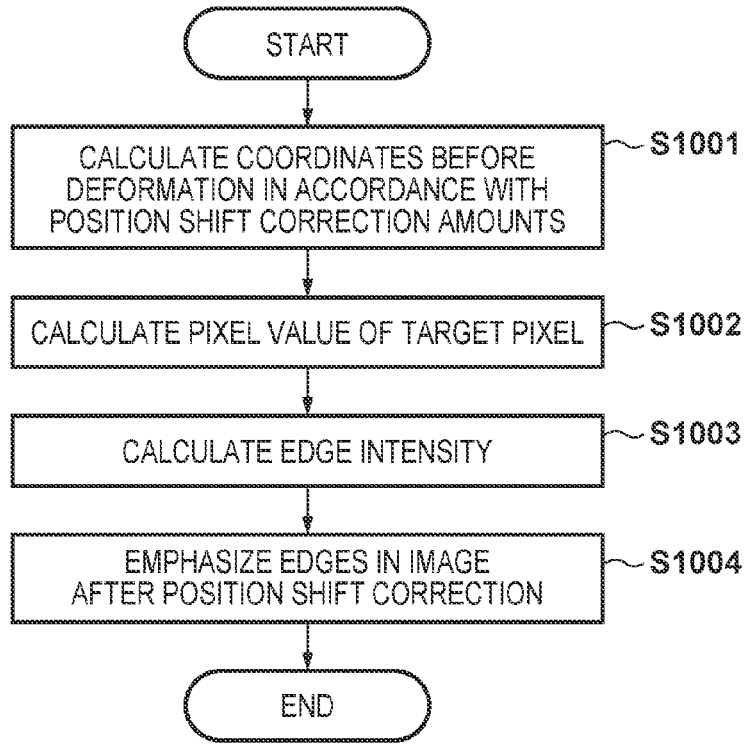
FIG. 10 is a flowchart showing position shift correction processing according to an embodiment.

The foregoing processing is illustrated by flowcharts of FIGS. 9 and 10. FIG. 9 is a flowchart showing processing executed by the position shift amount decision unit 134a according to the second embodiment to store coordinates before deformation, and FIG. 10 is a flowchart showing position shift correction processing according to the second embodiment. In step S901, the position shift amount decision unit 134a decides coordinates before deformation with respect to each representative point in an image after deformation. In step S902, the position shift amount decision unit 134a stores the coordinates before deformation that were decided in step S901 to the correction coordinate storage unit 601 in correspondence with the representative points. Note that it is sufficient for the processing shown in FIG. 9 to be executed once when the position shift correction amounts are changed, and it need not be executed for each target pixel.

FIG. 10 is a flowchart showing the position shift correction processing and the edge emphasis processing according to the second embodiment. In step S1001, the coordinate calculation unit 141a calculates the coordinates of a target pixel before deformation using the coordinates of representative points before deformation that are stored in the correction coordinate storage unit 601. In step S1002, the pixel calculation unit 142 calculates a pixel value of the target pixel based on the coordinates before deformation that were calculated in step S1001. In step S1003, the edge intensity calculation unit 132a calculates an edge intensity. In step S1004, the edge emphasis unit 133 emphasizes edges in the image after position shift correction.

The R image correction unit 121a generates a corrected image of an R component by applying the foregoing image processing shown in FIG. 10 to every pixel in the image after deformation. The G image correction unit 122a and B image correction unit 123a generate corrected images of a G component and a B component, respectively, by executing similar processing. The corrected images of the R, G, and B components thus generated are projected onto a screen 102 by an R image output unit 161, a G image output unit 162, and a B image output unit 163, respectively.

As described above, in the second embodiment, correction amounts vary in a plane, and the intensity of edge emphasis is changed depending on the correction amounts; thus, the second embodiment can provide an image projection apparatus that can restrain deterioration in sharpness caused by position shift correction, even if position shift correction amounts vary in a plane.

Third Embodiment

In the second embodiment, the edge intensity is calculated based on correction amounts obtained from the coordinates before deformation that were calculated by the coordinate calculation unit 141a; however, no limitation is intended in this regard. For example, when the position shift amount decision unit 134a stores pre-change coordinates of representative points to the correction coordinate storage unit 601 (FIG. 9) at the time of change in position shift correction amounts, the edge intensity may be calculated and stored to a storage unit in advance. A third embodiment introduces an example of such a configuration.

Figure 11:
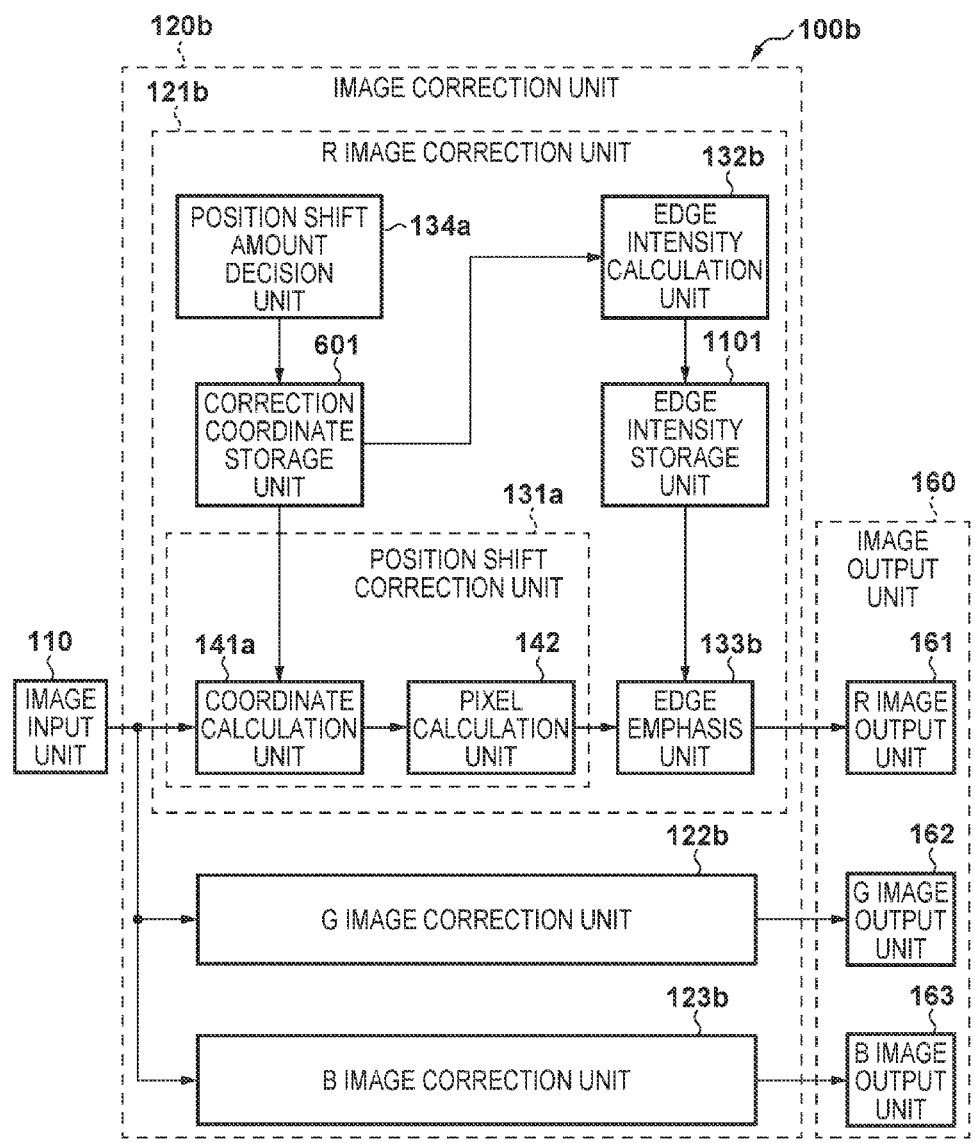
FIG. 11 is a block diagram showing an exemplary configuration of an image projection apparatus according to an embodiment.

FIG. 11 is a block diagram showing an exemplary configuration of an image projection apparatus 100b according to the third embodiment. A description is now given of the image projection apparatus 100b according to the third embodiment using the block diagram of FIG. 11. In FIG. 11, the elements similar to the elements of the second embodiment (FIG. 6) are given the same reference numerals thereas. Although it will be assumed that the elements shown in FIG. 11 are put in operation by a non-illustrated CPU executing a predetermined program, it goes without saying that they may be constituted by dedicated hardware in part or whole. The present embodiment also uses the hardware configuration described with reference to FIG. 18.

The image projection apparatus 100b according to the third embodiment includes an image input unit 110 that inputs images, an image correction unit 120b that corrects images, and an image output unit 160 that outputs images to a liquid crystal panel. The image correction unit 120b includes an R image correction unit 121b, a G image correction unit 122b, and a B image correction unit 123b that correct R images, G images, and B images, respectively. The R image correction unit 121b, G image correction unit 122b, and B image correction unit 123b have the same functions; in view of this, the R image correction unit 121b will be discussed below.

The R image correction unit 121b includes a position shift correction unit 131a that corrects a position shift in an input image, an edge intensity calculation unit 132b that calculates an edge intensity, an edge emphasis unit 133b that emphasizes edges in a corrected image, and a position shift amount decision unit 134a that decides position shift correction amounts. The R image correction unit 121b further includes a correction coordinate storage unit 601 that stores the position shift correction amounts, and an edge intensity storage unit 1101 that stores edge intensities. The following description mainly deals with the elements of the R image correction unit 121b that differ from their counterparts in the second embodiment.

With respect to representative points in an image corrected by the position shift correction unit 131a, the edge intensity calculation unit 132b calculates edge intensities to be used by the edge emphasis unit 133b based on coordinates before deformation stored in the correction coordinate storage unit 601. Then, the edge intensity calculation unit 132b stores the calculated intensities to the edge intensity storage unit 1101 in correspondence with the representative points. The number of edge intensities stored in the edge intensity storage unit 1101 is (W/N)×(H/N), for example, provided that the representative points are set at an interval of N pixels in both horizontal and vertical directions and an image after deformation has a resolution of W pixels in the horizontal direction and H pixels in the vertical direction. Hereinafter, the edge intensities stored in the edge intensity storage unit 1101 are expressed as VL[v][h]. Note that h is a representative point index for the horizontal direction, and v is a representative point index for the vertical direction.

It will be assumed that the number of sets of coordinates before deformation that are stored in the correction coordinate storage unit 601 is the same as the number of the stored edge intensities, in both horizontal and vertical directions. In this case, obtaining an edge intensity VL[v][h] has the same meaning as obtaining an edge intensity at a representative point pvh. The edge intensity calculation unit 132b can obtain an edge intensity VL[v][h] at coordinates GD[v][h] before deformation using, for example, Expression 4. The edge intensity calculation unit 132b stores the calculated edge intensity to the edge intensity storage unit 1101.

In the foregoing description, the number of sets of coordinates before deformation that are stored in the correction coordinate storage unit 601 is the same as the number of edge intensities stored in the edge intensity storage unit 1101 in both horizontal and vertical directions; however, no limitation is intended in this regard. When the number of sets of coordinates before deformation that are stored in the correction coordinate storage unit 601 is different from the number of edge intensities stored in the edge intensity storage unit 1101, edge intensities can be calculated as follows. The edge intensity calculation unit 132b can similarly calculate edge intensities by calculating coordinates before deformation with respect to representative points related to the edge intensities, that is, representative points in a corrected image, through processing similar to the processing executed by the position shift amount decision unit 134a. Alternatively, it can similarly calculate edge intensities by calculating coordinates before deformation from coordinates before deformation that are stored in the correction coordinate storage unit 601 with respect to representative points related to the edge intensities, that is, representative points in a corrected image, through processing similar to the processing executed by the coordinate calculation unit 141a.

The edge emphasis unit 133b emphasizes edges in an image deformed by the position shift correction unit 131a. The edges may be emphasized using any method; for example, the edge emphasis used in the first embodiment (the edge emphasis based on Expression 3) can be used.

Note that the edge emphasis unit 133b calculates an edge intensity ε from edge intensities stored in the edge intensity storage unit 1101. As edge intensities VL stored in the edge intensity storage unit 1101 are edge intensities at the representative points, the edge emphasis unit 133b calculates an edge intensity at a target pixel from edge intensities at neighbor representative points.

Figure 12:
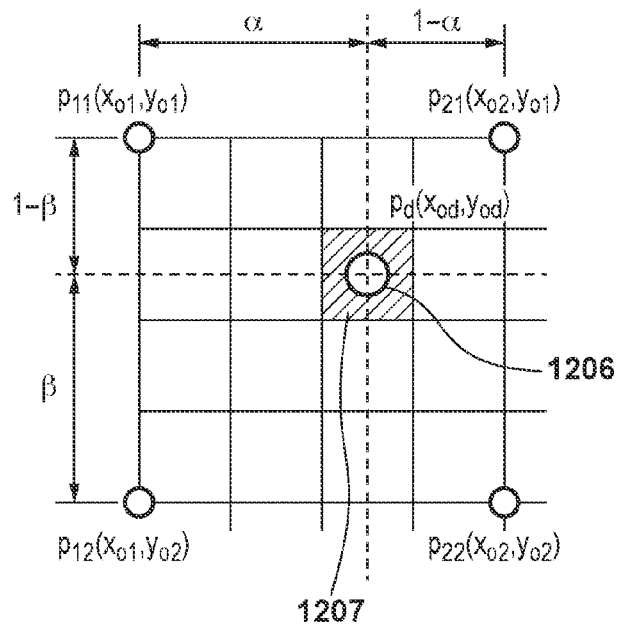
FIG. 12 is a diagram for describing a method of calculating an edge intensity according to an embodiment.

FIG. 12 is a diagram for describing a method of calculating an edge intensity at a target pixel. In FIG. 12, it will be assumed that edge intensities at representative points p11, p21, p22, and p12 are VL[1][1], VL[2][1], VL[2][2], and VL[1][2], respectively. The edge emphasis unit 133b calculates an edge intensity ε at a target pixel 1207 within a rectangle formed by these representative points by calculating an average of edge intensities at neighbor representative points as indicated by Expression 8 provided below.

$$\epsilon = (VL[1][1] + VL[2][1] + VL[2][2] + VL[1][2])/4 \quad \text{Expression 8}$$

Alternatively, the edge intensity may simply be the intensity at the upper-left representative point as follows.

$$\epsilon = VL[1][1] \quad \text{Expression 9}$$

Alternatively, the edge intensity may be the intensity at the closest representative point among the four representative points. In this case, the edge intensity is the edge intensity VL[2][1] at the representative point p21 in the example of FIG. 12, for example.

Alternatively, the edge intensity may be calculated from the four representative points through linear interpolation using the coordinate values of the target pixel as parameters. For example, in FIG. 12, coordinates 1206 after deformation $(x_{od}, y_{od})$, as well as coordinates $(x_{o1}, y_{o1})$, $(x_{o2}, y_{o1})$, $(x_{o2}, y_{o2})$, and $(x_{o1}, y_{o2})$ of the four surrounding representative points p11, p12, p21, and p22, are known. Therefore, a relative position α in the horizontal direction and a relative position β in the vertical direction of the target pixel 1207, which is in a quadrilateral formed by the four representative points p11, p12, p21, and p22, from coordinates $(x_{o1}, y_{o1})$ are calculated using Expression 4, and the edge intensity at the target pixel is calculated using the following expression.

$$\epsilon = \beta[(1-\alpha)VL[1][1] + \alpha VL[2][1]] + (1-\beta)[(1-\alpha)VL[1][2] + \alpha VL[2][2]] \quad \text{Expression 10}$$

Figure 13:
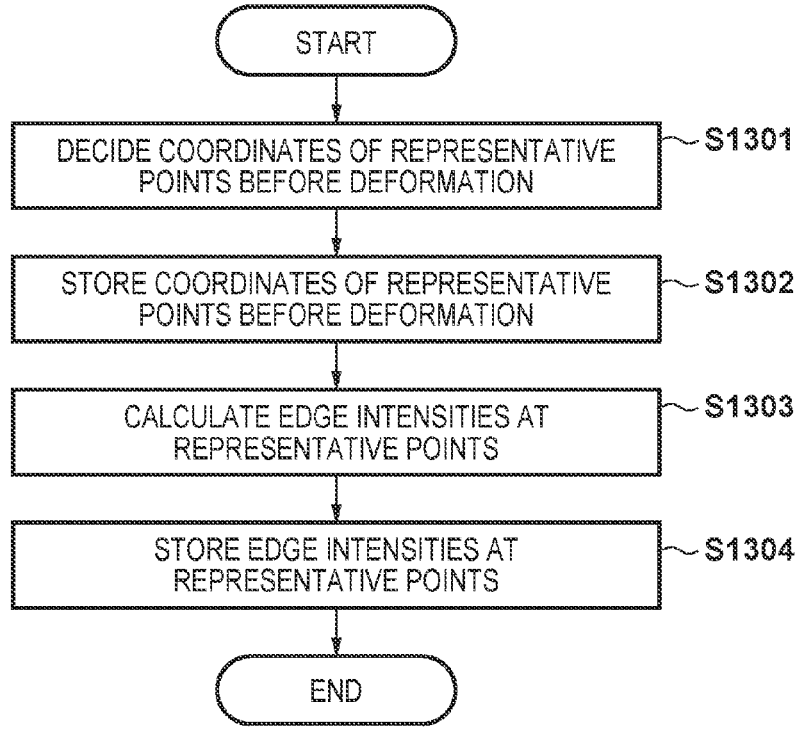
FIG. 13 is a flowchart showing processing for storing edge intensities according to an embodiment.
Figure 14:
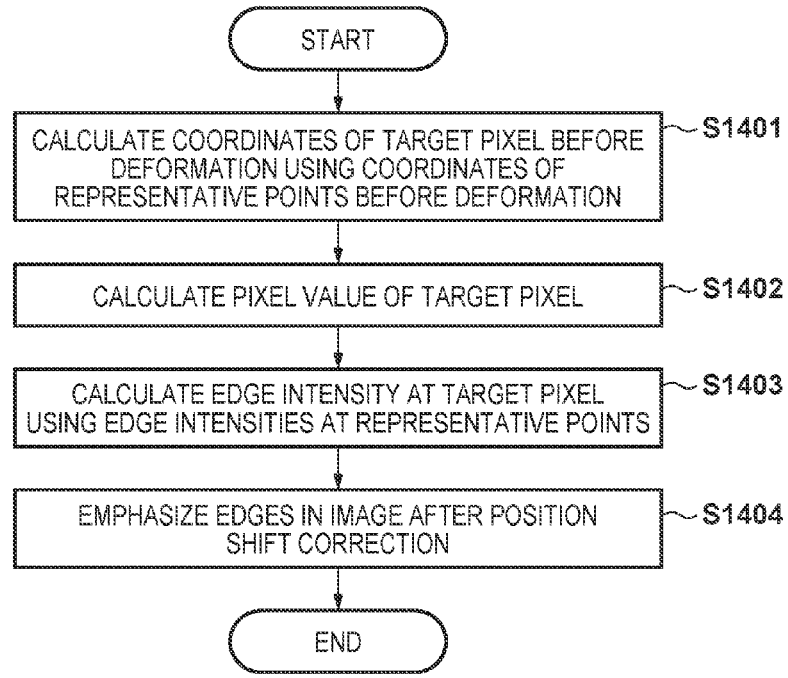
FIG. 14 is a flowchart showing position shift correction processing according to an embodiment.

The foregoing processing is illustrated by flowcharts of FIGS. 13 and 14. FIG. 13 is a flowchart showing processing for storing coordinates before deformation and edge intensities according to the third embodiment. In step S1301, the position shift amount decision unit 134a decides coordinates of representative points before deformation. In step S1302, the position shift amount decision unit 134a stores the coordinates of the representative points before deformation that were decided in step S1301 to the correction coordinate storage unit 601. In step S1303, the edge intensity calculation unit 132b calculates edge intensities at the representative points using the coordinates of the representative points before deformation. In step S1304, the edge intensity calculation unit 132b stores the calculated edge intensities at the representative points to the edge intensity storage unit 1101. Note that it is sufficient for the processing shown in FIG. 13 to be executed when the position shift correction amounts are changed, and it need not be executed for each target pixel.

FIG. 14 is a flowchart for describing position shift correction processing according to the third embodiment. In step S1401, the coordinate calculation unit 141a calculates the coordinates of a target pixel before deformation using the coordinates of representative points before deformation that are stored in the correction coordinate storage unit 601. Next, in step S1402, the pixel calculation unit 142 calculates a pixel value of the target pixel based on the coordinates of the target pixel before deformation that were calculated in step S1401. In step S1403, the edge emphasis unit 133b calculates an edge intensity at the target pixel from edge intensities at the representative points stored in the edge intensity storage unit 1101. In step S1404, the edge emphasis unit 133b emphasizes edges in an image after position shift correction, which is obtained from the position shift correction unit 131a, using the edge intensity calculated in step S1403. The R image correction unit 121b generates a corrected image of an R component by applying the position shift correction processing shown in FIG. 14 to every pixel. The G image correction unit 122b and B image correction unit 123b generate corrected images of a G component and a B component, respectively, by executing similar processing. The corrected images of the R, G, and B components thus generated are projected onto a screen 102 by an R image output unit 161, a G image output unit 162, and a B image output unit 163, respectively.

As described above, in the third embodiment, edge intensities are calculated and stored in advance when position shift correction amounts are changed; thus, the third embodiment can provide an image projection apparatus that can restrain deterioration in sharpness caused by position shift correction without calculating an edge intensity for each individual target pixel.

Fourth Embodiment

In a fourth embodiment, a camera shoots an image that is projected onto a screen by an image projection apparatus, a position shift in the projected image is detected from the shot image, and position shift correction amounts are decided in accordance with the result of the detection. The image projection apparatus corrects the position shift in accordance with the position shift correction amounts that were decided, and emphasizes edges in accordance with an amount of the position shift.

Figure 15:
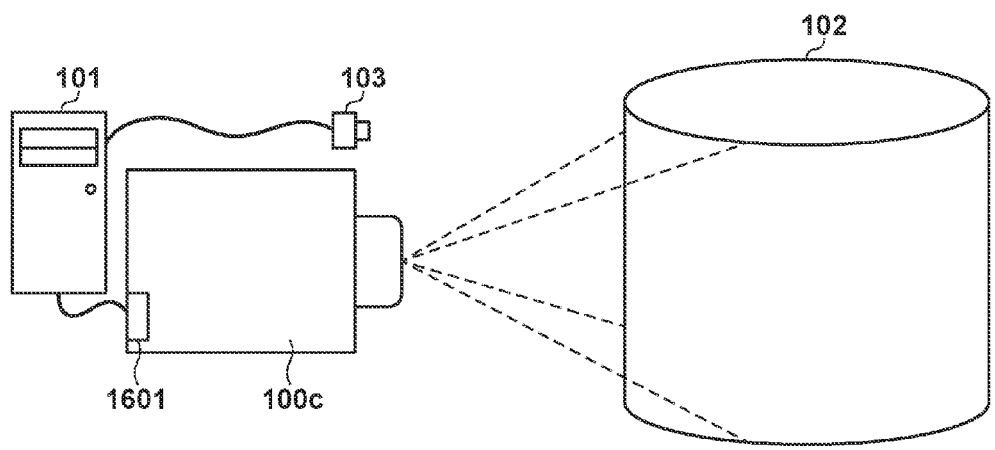
FIG. 15 shows an exemplary system configuration according to an embodiment.

First, the connection between and the operations of an image projection apparatus 100c, an image capture apparatus 103, and an information processing apparatus 101 according to the fourth embodiment will be described using FIG. 15. First, the image projection apparatus 100c projects an image onto a screen 102 without performing position shift correction. The image capture apparatus 103 shoots the image that has been projected onto the screen 102 without being corrected, and transmits the shot image to the information processing apparatus 101. The information processing apparatus 101 generates correction coordinates that are necessary for the position shift correction from the shot image received, and transmits the correction coordinates to the image projection apparatus 100c. For example, the information processing apparatus 101 causes the image projection apparatus 100c to project a grid pattern, and obtains a shot image of the projected grid pattern from the image capture apparatus 103. The information processing apparatus 101 generates, from the obtained image, correction coordinates that are necessary for the position shift correction with respect to each grid point in the projected image of the grid pattern, and provides the correction coordinates to the image projection apparatus 100c. The image projection apparatus 100c applies the position shift correction and edge emphasis using the provided correction coordinates.

Figure 16:
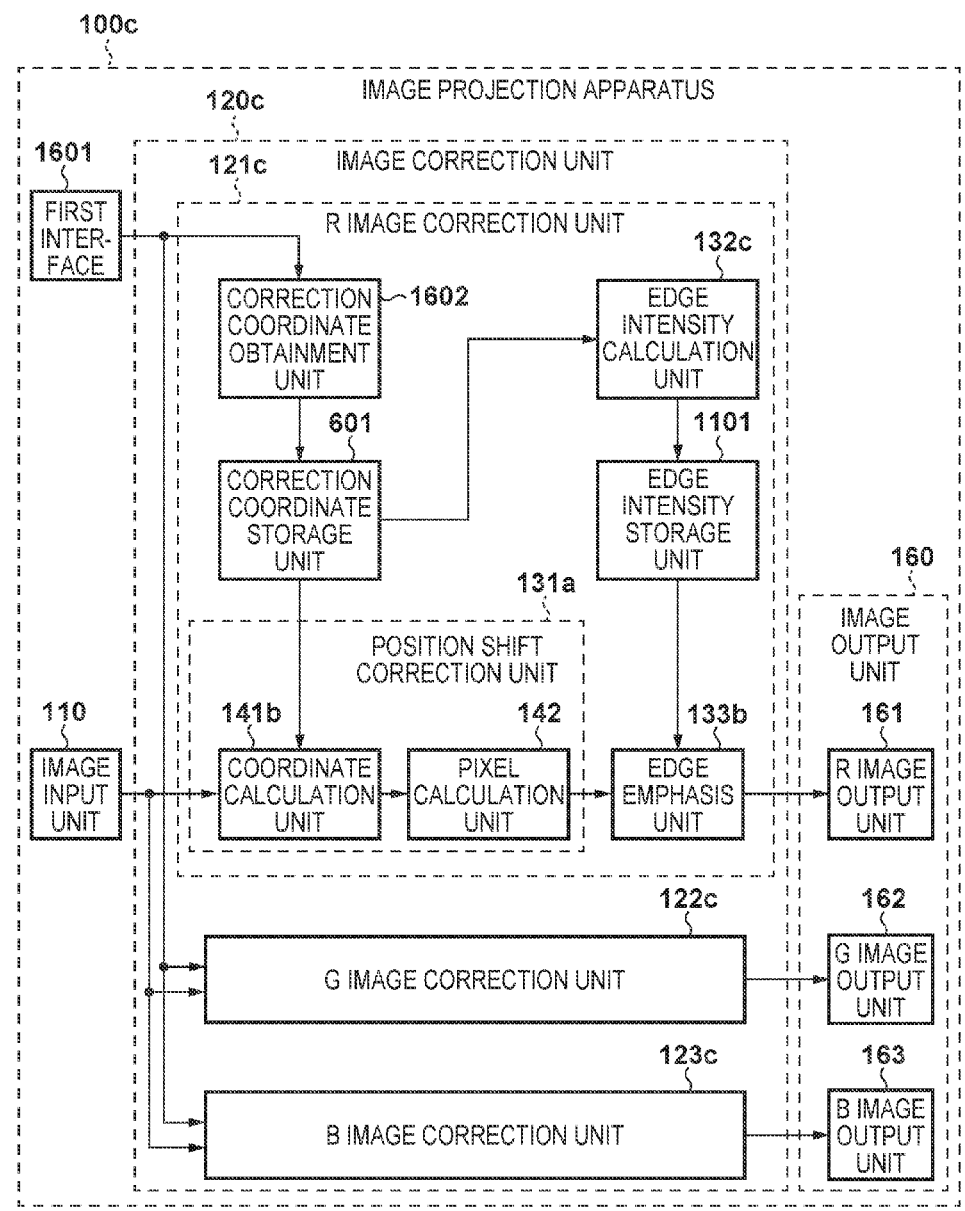
FIG. 16 is a block diagram showing an exemplary configuration of an image projection apparatus according to an embodiment.

FIG. 16 shows a configuration of the image projection apparatus 100c. In FIG. 16, the elements similar to the elements of the third embodiment (FIG. 11) are given the same reference numerals thereas. A description is now given of an exemplary configuration of the image projection apparatus 100c according to the fourth embodiment using a block diagram of FIG. 16. Although it will be assumed that the elements shown in FIG. 16 are put in operation by a non-illustrated CPU executing a predetermined program, it goes without saying that they may be constituted by dedicated hardware in part or whole. The present embodiment also uses the hardware configuration described with reference to FIG. 18.

The image projection apparatus 100c according to the fourth embodiment includes an image input unit 110 that inputs images, an image correction unit 120c that corrects images, and an image output unit 160 that outputs images to a liquid crystal panel. The image correction unit 120c includes an R image correction unit 121c, a G image correction unit 122c, and a B image correction unit 123c that correct R images, G images, and B images, respectively. The image output unit 160 includes an R image output unit 161, a G image output unit 162, and a B image output unit 163 that output R images, G images, and B images, respectively. A first interface 1601 establishes connection with the information processing apparatus 101. In the present embodiment, correction coordinates are obtained from the information processing apparatus 101 via the first interface. The first interface 1601 may use, for example, RS-232-C or Universal Serial Bus (USB).

The R image correction unit 121c, G image correction unit 122c, and B image correction unit 123c have the same functions; in view of this, the R image correction unit 121c will be discussed below in the present embodiment. The R image correction unit 121c includes a position shift correction unit 131a that corrects a position shift in an input image, an edge intensity calculation unit 132c that calculates an edge intensity, and an edge emphasis unit 133b that emphasizes edges in a corrected image. The R image correction unit 121c further includes a correction coordinate storage unit 601 that stores position shift correction amounts, and an edge intensity storage unit 1101 that stores edge intensities. A correction coordinate obtainment unit 1602 performs an operation of storing correction coordinates (in an image of an R component) obtained from the information processing apparatus 101 via the first interface 1601. The following description mainly deals with the elements of the R image correction unit 121c that differ from their counterparts in the third embodiment.

The correction coordinate obtainment unit 1602 stores the correction coordinates obtained from the first interface 1601 to the correction coordinate storage unit 601. Note that the correction coordinates may be coordinates before deformation, such as a point $(x_{i00}, y_{i00})$ corresponding to a point $(x_{o0}, y_{o0})$ in FIG. 7, or may be coordinates after deformation, such as a point $(x_k, y_k)$, which is the same in form as the point $(x_{o0}, y_{o0})$. Coordinates after deformation are coordinates that are present in an image 704 after deformation in correspondence with grid points set in an input image 701. In FIG. 7, a point $(x_{k0}, y_{k0})$ represents coordinates after deformation that correspond to a point (0, 0) in the input image 701 before deformation. The position shift correction unit 131a operates on the premise that the correction coordinates are coordinates before deformation. Therefore, when the correction coordinates obtained by the first interface 1601 are coordinates before deformation, the correction coordinate obtainment unit 1602 stores the obtained correction coordinates to the correction coordinate storage unit 601 as-is. On the other hand, when the obtained correction coordinates are coordinates after deformation, the correction coordinate obtainment unit 1602 stores a point obtained by rotating the point $(x_k, y_k)$ by 180 degrees about a representative point, specifically, the point $(x_{o0}, y_{o0})$, as coordinates before deformation.

When coordinates before deformation are stored in the correction coordinate storage unit 601, the coordinate calculation unit 141b calculates the coordinates of a target pixel before deformation by executing processing similar to the processing according to the above-described second embodiment. On the other hand, when coordinates after deformation are stored in the correction coordinate storage unit 601, the coordinate calculation unit 141b calculates the coordinates of the target pixel before deformation from a position of the target pixel relative to the coordinates of surrounding representative points after deformation. Furthermore, when coordinates before deformation are stored in the correction coordinate storage unit 601, the edge intensity calculation unit 132c calculates edge intensities at representative points by executing processing similar to the processing according to the above-described second embodiment. On the other hand, when coordinates after deformation are stored in the correction coordinate storage unit 601, the edge intensity calculation unit 132c calculates edge intensities based on, for example, a difference from the nearest-neighbor integer value.

Figure 17:
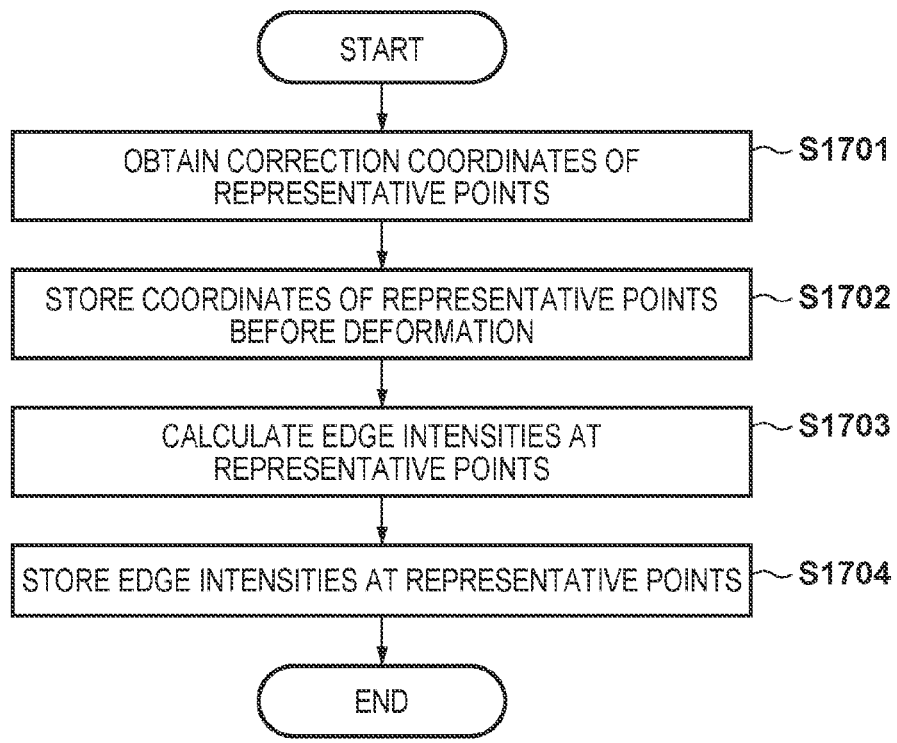
FIG. 17 is a flowchart showing processing for storing edge intensities according to an embodiment.

FIG. 17 is a flowchart showing processing for storing coordinates before deformation and edge intensities according to the fourth embodiment. In step S1701, the first interface 1601 obtains correction coordinates of representative points from the external information processing apparatus 101. In step S1702, the correction coordinate obtainment unit 1602 transforms the correction coordinates obtained in step S1701 into coordinates before deformation, and stores the coordinates before deformation to the correction coordinate storage unit 601. In step S1703, the edge intensity calculation unit 132c calculates edge intensities at the representative points using the coordinates of the representative points before deformation. In step S1704, the edge intensity calculation unit 132c stores the calculated edge intensities at the representative points to the edge intensity storage unit 1101. Note that the processing shown in FIG. 17 is executed when correction coordinates are transmitted from the external information processing apparatus 101, and it need not be executed for each target pixel.

The position shift correction unit 131a calculates a pixel value in a corrected image using the coordinates before deformation stored in the correction coordinate storage unit 601. Then, the edge emphasis unit 133b applies edge emphasis processing to the corrected image using the edge intensities stored in the edge intensity storage unit 1101. The foregoing position shift correction processing is the same as the processing described with reference to the flowchart of FIG. 14. The R image correction unit 121b generates a corrected image of an R component by applying the position shift correction processing shown in FIG. 14 to every pixel. The G image correction unit 122b and B image correction unit 123b generate corrected images of a G component and a B component, respectively, by executing similar processing. The corrected images of the R, G, and B components thus generated are projected onto a screen 102 by an R image output unit 161, a G image output unit 162, and a B image output unit 163, respectively.

As described above, in the fourth embodiment, position shift correction amounts are obtained from an external apparatus; thus, the fourth embodiment can provide an image projection apparatus that can restrain deterioration in sharpness caused by position shift correction, even if the position shift correction is performed in combination with the external apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-101936, filed May 20, 2016, which is hereby incorporated by reference herein in its entirety.

What is claimed is:

1. An image processing apparatus, comprising:
    a memory configured to store instructions; and
    a processor configured to execute the instructions to:
        determine a position shift correction amount for reducing a shift between a position in an image indicated by data and a position in the image in a projected state;
        calculate an edge intensity to be used in edge emphasis processing for the image based on the determined position shift correction amount;
        apply position shift correction to data of the image based on the determined position shift correction amount; and
        execute the edge emphasis processing with respect to the data of the image after the position shift correction, based on the calculated edge intensity.

2. The apparatus according to claim 1, wherein the edge intensity is calculated from a fractional value of the position shift correction amount.

3. The apparatus according to claim 2, wherein the edge intensity is calculated so that the larger a difference between a value of the position shift correction amount inclusive of the fractional value and a nearest-neighbor integer value, the larger a degree of edge emphasis.

4. The apparatus according to claim 1, wherein the position shift correction amount indicates a moving direction and a moving amount of a pixel in the position shift correction.

5. The apparatus according to claim 1, wherein the same position shift correction amount is determined for an entirety of a screen for the image.

6. The apparatus according to claim 5, wherein the position shift correction amount indicates translation in an x-direction and/or a y-direction.

7. The apparatus according to claim 1, wherein the same position shift correction amount is determined in accordance with correction amounts at two-dimensional positions in the image.

8. The apparatus according to claim 7, further including a first storage for storing position shift correction amounts in one-to-one correspondence with a plurality of representative points set in the image after the position shift correction,
    wherein the position shift correction amounts are determined in one-to-one correspondence with pixels in the image based on the position shift correction amounts that are stored in the first storage in one-to-one correspondence with the plurality of representative points.

9. The apparatus according to claim 8, wherein the first storage stores coordinates of the plurality of representative points before movement caused by the position shift correction as the position shift correction amounts.

10. The apparatus according to claim 8, further comprising
    a second storage configured to store edge intensities at a plurality of positions in the image, the edge intensities being calculated based on the position shift correction amounts that are in one-to-one correspondence with the plurality of representative points, wherein
    an edge intensity is calculated at each position in the image after the position shift correction based on the edge intensities at the plurality of positions stored in the second storage.

11. The apparatus according to claim 10, wherein the edge intensities stored in the second storage are in one-to-one correspondence with the plurality of representative points.

12. The apparatus according to claim 1, wherein the position shift correction amount is determined based on information of the position shift correction amount obtained from outside.

13. The apparatus according to claim 1, further comprising
    a projection unit configured to project the image after the edge emphasis processing has been executed.

14. The apparatus according to claim 1, wherein
the position shift correction amount is determined with respect to an image of at least one color component included among a plurality of color components.

15. An image processing method, comprising:
determining a position shift correction amount for reducing a shift between a position in an image indicated by data and a position in the image in a projected state;
calculating an edge intensity to be used in edge emphasis processing for the image based on the position shift correction amount;
applying position shift correction to data of the image based on the position shift correction amount; and
executing the edge emphasis processing with respect to the data of the image after the position shift correction based on the edge intensity.

16. A non-transitory computer readable storage medium storing a program for causing a computer to execute an image processing method comprising:
determining a position shift correction amount for reducing a shift between a position in an image indicated by data and a position in the image in a projected state;
calculating an edge intensity to be used in edge emphasis processing for the image based on the position shift correction amount;
applying position shift correction to data of the image based on the position shift correction amount; and
executing the edge emphasis processing with respect to the data of the image after the position shift correction based on the edge intensity.

* * * * *